United States Patent
Lucas et al.

(10) Patent No.: US 7,931,961 B1
(45) Date of Patent: Apr. 26, 2011

(54) COMPOSITE EXHAUST FLUE

(75) Inventors: Rick D. Lucas, St. Clairsville, OH (US); Douglas J. Merriman, Wheeling, WV (US); Gregg W. Wolfe, Weeling, WV (US); Brian L. Gordon, Wheeling, WV (US)

(73) Assignee: Touchstone Research Laboratory, Ltd., Triadelphia, WV (US)

( * ) Notice: Subject to any disclaimer, the term of this patent is extended or adjusted under 35 U.S.C. 154(b) by 463 days.

(21) Appl. No.: 12/170,457

(22) Filed: Jul. 10, 2008

Related U.S. Application Data

(60) Provisional application No. 60/949,224, filed on Jul. 11, 2007.

(51) Int. Cl.
*B32B 3/26* (2006.01)
*F23D 14/46* (2006.01)

(52) U.S. Cl. ............... 428/307.3; 428/689; 428/698; 428/699; 428/701; 428/702; 431/305

(58) Field of Classification Search .............. None
See application file for complete search history.

(56) References Cited

U.S. PATENT DOCUMENTS

| 2002/0121309 A1* | 9/2002 | Davis et al. .................. 138/149 |
| 2005/0095178 A1* | 5/2005 | Heidenreich ................. 422/177 |

FOREIGN PATENT DOCUMENTS

| JP | 06-21373 | * | 8/1994 |
| JP | 09-178154 | * | 7/1997 |
| JP | 2001-201037 | * | 7/2001 |

OTHER PUBLICATIONS

Translation of JP-06-213573.*

* cited by examiner

*Primary Examiner* — Ling Xu
(74) *Attorney, Agent, or Firm* — Philip D. Lane

(57) ABSTRACT

A composite exhaust flue which may be used to shield an area or object from convective, conductive, or radiated heat transfer from hot exhaust combustion gases is described. In certain embodiments, the composite exhaust flue may be used to protect structures from hot exhaust gases and particles such as those produced by cars, trucks, ships, boats, jets, rockets, as well as other vehicles with internal combustion engines, turbines, or rocket motors. In some embodiments, a composite exhaust flue may comprise a ceramic fiber reinforced ceramic composite high temperature face sheet positioned over an insulating layer and a structural support layer comprising a rigid, porous foam material.

15 Claims, 1 Drawing Sheet

COMPOSITE EXHAUST FLUE

CROSS-REFERENCE TO RELATED APPLICATIONS

This application claims priority to and is a non-provisional of U.S. Provisional Patent Application No. 60/949,224, filed on Jul. 11, 2007, herein specifically incorporated by reference in its entirety.

STATEMENT OF FEDERALLY SPONSORED RESEARCH OR DEVELOPMENT

This invention was made with Government support under contract number M67854-05-C-0027 awarded by the U.S. Marine Corps. The Government has certain rights in the invention.

DETAILED DESCRIPTION OF CERTAIN EMBODIMENTS OF THE INVENTION

Figure 1:
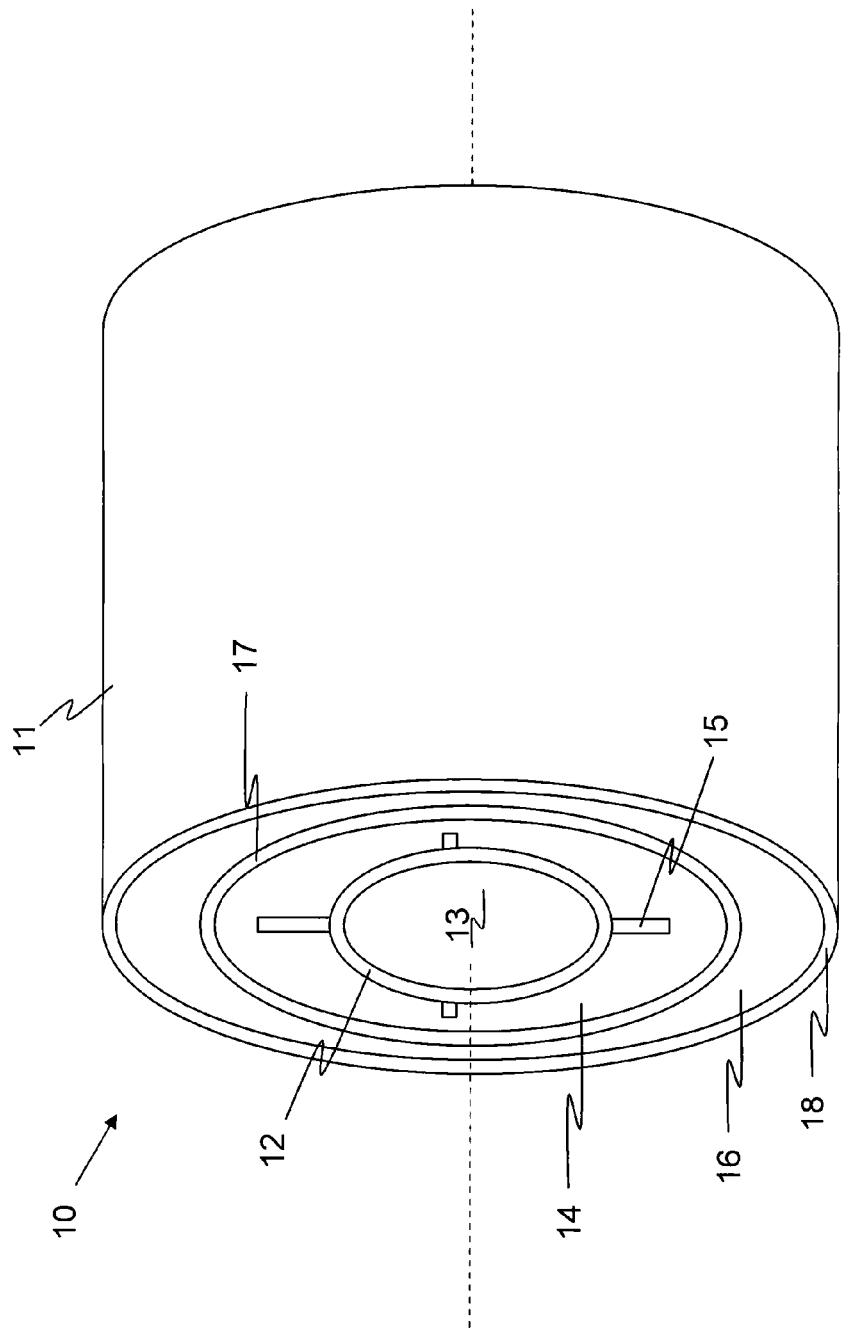
FIG. 1 is a diagrammatic cross-sectional representation of a composite exhaust flue in accordance with an embodiment of the invention.

A composite exhaust flue which may be used to shield an area or object from convective, conductive, or radiated transfer of heat from hot combustion exhaust gases is described. The location of such conductive, convective, or radiated heat may be referred to as a high temperature environment. Additionally, the objects and/or areas to be shielded may be collectively referred to as structures. In certain embodiments, the composite exhaust flue may be used to protect structures from hot exhaust gases and particles such as those produced by cars, trucks, ships, boats, jets, rockets, as well as other vehicles with internal combustion engines, turbines, or rocket motors.

With reference to FIG. 1, there is illustrated a composite exhaust flue in accordance with an embodiment of the invention, designated generally by the reference numeral 10. The composite exhaust flue has a generally cylindrical shaped body 11 defining a through bore 13 extending therethrough. Hot combustion exhaust gases from a hot combustion source, such as an engine, pass through the through bore of the composite gas flue. While the embodiment illustrated in FIG. 1 has a round cross-sectional shape, the composite exhaust flue may have other cross-sectional shapes including, but not limited to, oval, square, rectangular, triangular, pentagonal, hexagonal, or other polygonal cross-sectional shapes. In certain embodiments, the composite exhaust flue 10 may comprises an inner layer comprising a ceramic fiber reinforced ceramic composite material ("CFCC") face sheet 12 positioned over an insulating layer 14 and a structural support layer 16.

The CFCC face sheet 12 will generally be the layer of the composite exhaust flue 10 that will be in contact with the high temperature environment. The CFCC face sheet 12 is a material that is mechanically and chemically robust with respect to the high temperature environment to which the high temperature composite will be exposed. In certain embodiments, the CFCC face sheet 12 may withstand temperatures of at least about 700° F. without significant physical or chemical degradation. In some embodiments the CFCC face sheet 12 may withstand temperatures ranging from about 700° F. to about 2000° F., or higher without significant mechanical or chemical degradation. In certain embodiments, the CFCC face sheet 12 may be chemically inert with respect to hot combustion products produced by internal combustion engines, turbines, or rocket motors. The hot combustion products may include hydrocarbon combustion products such as carbon dioxide, carbon monoxide, water, and hydrocarbon products resulting from incomplete combustion. The hot combustion product may also include, but is not limited to, oxides of nitrogen and sulfur, as well as particulates in the exhaust gas. The CFCC face sheet 12 may have a low thermal conductivity. In certain embodiments, the thermal conductivity may be below about 100 W/m K, in additional embodiments below about 50 W/m K. In various other embodiments, the thermal conductivity may be below about 30 W/m K. In still other embodiments, the thermal conductivity may be below about 10 W/m K, and in still further embodiments, the thermal conductivity may be below about 3 W/m K. In some embodiments, the thermal conductivity may range from about 1 W/m K to about 30 W/m K.

The CFCC face sheet 12 is a ceramic fiber reinforced ceramic material comprising ceramic fibers embedded within a ceramic matrix material. The ceramic matrix material may include, but is not limited to, metal oxide ceramics such as alumina, silica, magnesia, zirconia, and other refractory ceramics such as nitrides, borides, carbides, silicon carbide, and other ceramics that are able to with stand the operational conditions of the thermally insulating composite. The ceramic fibers may include fibers comprising any of the ceramic materials described above for the ceramic matrix. The ceramic fibers may include, but are not limited to, metal oxide ceramic fibers such as alumina fibers, silica fibers, magnesia fibers, zirconia fibers, and other refractory ceramic fibers such as fibers made from nitrides, borides, basalts, carbides, silicon carbide, and other ceramic materials that are able to withstand the operational conditions of the thermally insulating composite. In certain embodiments, glass or quartz fibers may be used as the ceramic fibers. In some embodiments the ceramic fiber reinforced ceramic material comprises alumina fibers embedded in an alumina matrix.

The thickness of the CFCC face sheet 12 is not particularly limited and may depend upon a variety of design factors. For many embodiments the thickness of the CFCC face sheet may be at least about 0.02 inches. For some embodiments, the thickness of the CFCC face sheet may range from about 0.02 inches to about 1 inch, or greater. In certain embodiments, the thickness of the CFCC face sheet may range from about be about 0.1 inches to about 0.5 inches. In other embodiments, the thickness of the CFCC face sheet may range from about 0.1 inches to about 0.25 inches.

With continued reference to FIG. 1, an insulating layer 14 is provided between the CFCC face sheet 12 and the structural support layer 16. The insulating layer 14 is a layer of material that is mechanically and chemically robust with respect to the high temperature environment in which the high temperature composite will be used. In certain embodiments, the insulating layer 14 may withstand temperatures of at least about 700° F. without significant physical or chemical degradation. In some embodiments, the insulating layer 14 may withstand temperatures ranging from about 700° F. to about 2000° F., or higher without significant mechanical or chemical degradation. In some embodiments, the insulating layer 14 is physically and chemically robust over the same or similar temperatures as the CFCC face sheet 12.

The insulating layer 14 reduces the heat transport from the CFCC face sheet 12 to the structural support layer 16 whereby the structural support layer 16 is exposed to a temperature about equal to or below the use temperature of the structural support layer 16. The use temperature of the structural support layer 16 is that temperature above which, the material comprising the structural support layer begins to lose its chemical and physical integrity in air.

In certain embodiments, the insulating layer 14 may comprise one or more layers of a flexible or compressible ceramic material. The flexible or compressible ceramic material may be in the form of felts, wools, cloths, other woven or non-woven ceramic textiles, or ceramic materials. The ceramic material used for the insulating layer 14 may comprise, but is not limited to, metal oxides, nitrides, borides, basalts, carbides, silicon carbide, and other ceramic materials meeting the temperature requirements of the thermally insulating composite. The metal oxides may include, but are not limited to alumina, silica, magnesia, zirconia, and other metal oxides. In some embodiments, the insulating layer 14 may comprise glass or quartz fibers.

The thickness of the insulating layer 14 is not particularly limited and may vary widely depending on a variety of design factors, including but not limited to, the exposure temperature of the high temperature environment, the materials used for the high temperature face sheet, the use temperature of the structural support layer, and the composition and form of the insulating layer. The thickness if the insulating layer 14 should be such that the temperature the structural support layer 16 is exposed to is less than the use temperature for the structural support layer 16.

In some embodiments, the insulating layer 14 provides mechanical isolation between the CFCC face sheet 12 and the structural support layer 16. Still further, the insulating layer 14 may provide acoustical dampening and vibration isolation benefits. As the length of the composite exhaust flue increases, the CFCC face sheet may tend to droop and compress the insulation layer. This compression may reduce the insulative value of the insulation layer. Further, in moving systems such as automobiles, boats, planes, etc., the CFCC face sheet will have a tendency to vibrate and move relative to the structural support layer 16. To reduce compressing the insulation layer and to reduce breaking the CFCC face sheet due to extreme movements or shocks, in some embodiments, it may be desirable to provide one or more supports 15 between the CFCC face sheet 12 and the structural support layer 16.

The optional supports 15 may be made from a ceramic material similar or compatible with the materials used for the CFCC face sheet 12. If used, the supports may be positioned between the ceramic fiber reinforced ceramic composite material face sheet and the structural support layer without physically contacting at least one of the fiber reinforced ceramic composite material face sheet and the structural support layer. In some embodiments, the supports 15 may extend from the CFCC face sheet 12 towards the structural support layer 16. To maintain mechanical isolation of the CFCC face sheet 12 with respect to the structural support layer 16, the supports 15 need not physically contact the structural support layer 16. Alternatively, the supports 15 may extend from the structural support layer 16 towards the CFCC face sheet 12 without physically contacting the CFCC face sheet.

The structural support layer 16 provides mechanical stability and structural support for the composite exhaust flue 10. The structural support layer 16 is comprised of a rigid, porous foam material which provides structural support for the composite exhaust flue. By using a foam material, the composite exhaust flue may maintain its structural integrity and while benefiting from a weight reduction when compared to other thermally insulating systems. In some embodiments, the foam material may include, but is not limited to, ceramic foams, ceramic aerogels, carbon foam, metal foams, polymeric foam, high temperature polymeric foams, and syntactic foams. In certain embodiments, the foam material may be a closed cell foam or an open cell foam. Further, in some embodiments, the foam material is a lightweight material. In certain embodiments the foam material may have a density ranging from about 0.05 g/cc to about 0.8 g/cc. Further, the foam material may have a compressive strength above about 20 psi, in other embodiments the compressive strength may range from about 200 psi to about 5,000 psi. In some embodiments, the structural support layer may have a thermal conductivity below about 5 W/m K. In further embodiments, the structural support layer may have a thermal conductivity below about 1 W/m K. In certain embodiments the structural support layer may comprise carbon foam having a density ranging from about 0.05 g/cc to about 0.8 g/cc, a compressive strength ranging from about 200 psi to about 5,000 psi, and a thermal conductivity below about 1 W/m K.

The thickness of the structural support layer 16 is not particularly limited and may vary widely. The thickness should be sufficient to provide the required or desired mechanical stability to the composite exhaust flue. In some embodiments, the thickness should be sufficient to provide for structural attachment of the composite exhaust flue to a structural assembly. The thickness of the foam layer 16 will vary depending upon the particular design configuration and requirements of the composite exhaust flue and possibly the particular structural assembly the composite gas flue will be attached to. Other factors that may affect the thickness of the carbon foam layer may include, but are not limited to, the composition and physical characteristics of the foam material, and the overall size and weight of the composite exhaust flue. In certain embodiments, the thickness of the foam layer may range from about ⅛ of an inch to about 2 inches, or greater.

In some embodiments, the composite exhaust flue may include at least one additional layer 17 positioned between the insulating layer 14 and the structural support layer 16. The additional layer(s) may be constructed from materials that have a use temperature about equal to or about greater than the use temperature for the structural support layer. In some embodiments, the additional layer(s) may be made from any of the materials or composites used for the CFCC face sheet or carbon foam layer described above. In further embodiments, the additional layer(s) may be made from a fiber reinforced polymer matrix composite, a fiber reinforced metal matrix composites, a metal, and/or a high temperature polymer. The thickness of the additional layer(s) is not particularly limited and may be variable and depend upon the particular design configuration.

If desired, a backing layer 18 may be optionally provided on one or more surfaces of the structural support layer 16. The backing layer may provide additional dimensional stability to the high temperature composite and may also protect surfaces of the carbon foam material of the structural support layer. In some embodiments, the backing layer 18 may include but is not limited to, CFCC, polymer matrix composites, metal matrix composites, carbon fiber composites, ceramics, glass, metal, polymer coatings, or other materials that may be coated on the surface of the structural support layer 16.

Some embodiments of a thermally insulating composite may include a two or more insulating layers and/or structural layers. For example, in some embodiments, additional insulating layers and structural layers may alternate through the thickness of the thermally insulating composite. In further embodiments, additional insulating layers and/or additional structural layers may be repeated in any combination through the thickness of the composite which may provide for additional acoustic dampening or structural isolation.

The ends of the composite gas flue around the through bore may be sealed with the same materials used for the CFCC face sheet described above. Alternatively flanges or other similar devices may be used to seal the ends of the composite gas flue around the through bore.

In constructing the composite exhaust flue, layers that have incompatible cure temperatures may be formed and cured separately prior to assembling the composite gas flue. Any adjacent layers having substantially compatible cure temperatures may be constructed and cured together. Each of the layers or components of the composite exhaust flue may be adhered to one another using compatible glues and adhesives having use temperatures which substantially match or exceeds the use temperature of adjacent layers of the composite exhaust flue. Standard techniques for assembling composite materials may be used for constructing the composite exhaust flue.

In use, the composite exhaust flue may be orientated to a hot combustion gas source such that the hot exhaust gases are directed through the through bore of the composite exhaust flue. In certain embodiments the composite exhaust flue is directly connected to a combustion source such that exhaust gases from the combustion source pass directly into the through bore of the composite exhaust flue. In additional embodiments, the composite exhaust flue is in fluid communication with exhaust emitting from a combustion source. The composite exhaust flue may be attached to the combustion source by standard mechanical attachment mechanisms including flanges, screws, bolts, rivets and other similar attachment mechanisms. In some embodiments, the structural support layer may be rigidly or non-rigidly connected to a support structure. Non-rigid connections may utilize, but are not limited to strain isolation mechanisms and techniques.

The following examples are provided to illustrate various thermally insulating composites. The examples are provide for illustrative purposes and are not intended to limit the invention in any way.

Example 1

A vehicle exhaust component was made from a thermally insulating composite. The thermally insulating composite comprised an inner surface (exhaust side) made of 0.045" thick ceramic fiber reinforced ceramic composite material (CFCC) layer made with a woven ceramic textile comprising Nextel 720 ceramic fibers (an aluminosilica fiber commercially available from 3M Company, St. Paul, Minn.) embedded in an aluminum oxide matrix. The layer behind the CFCC was composed of 0.25" of Fiberfrax, a refractory ceramic fiber insulation, followed by another 0.045" thick CFCC layer made with a woven ceramic textile comprising Nextel 720 ceramic fibers embedded in an aluminum oxide matrix. This was bonded to a 0.25" thick carbon foam material, CFOAM® 17 (commercially available from Touchstone Research Laboratory, Ltd., Triadelphia, W. Va.). A carbon fiber with an epoxy resin was then bonded to the carbon foam to form the outside surface. At various locations ribs made from the same CFCC material were installed between the first and second CFCC layers in between the Fiberfrax.

Example 2

A marine vessel exhaust component was made from a thermally insulating composite. The thermally insulate composite comprised an inner surface (exhaust side) made of 0.10" thick ceramic fiber reinforced ceramic composite material (CFCC) layer made with a woven ceramic textile comprising Nextel 312 ceramic fibers (an aluminoborosilicate fiber commercially available from 3M Company, St. Paul, Minn.) embedded in an aluminum oxide matrix. The second layer behind the CFCC was composed of 0.25" of Fiberfrax, a refractory ceramic fiber insulation, followed by 0.50" thick carbon foam material, CFOAM® 17 (commercially available from Touchstone Research Laboratory, Ltd., Triadelphia, W. Va.). Additional Fiberfrax was located behind the CFOAM and a 0.10" of CFCC layer made with a woven ceramic textile comprising Nextel 312 ceramic fibers embedded in an aluminum oxide matrix was used for the exterior surface. The inner and exterior surfaces were formed in the shape of a clam shell and bonded together enclosing the thermal and structural materials inside.

What is claimed is:

1. A composite exhaust flue comprising a body defining a through bore extending therethrough, wherein the composite exhaust flue comprises an inner layer comprising a ceramic fiber reinforced ceramic composite material face sheet, a structural support layer, and an insulating layer positioned between the ceramic fiber reinforced ceramic composite and the structural support layer, wherein the ceramic fiber reinforced ceramic composite material face sheet can withstand temperatures ranging from about 700° F. to about 2000° F. without significant mechanical or chemical degradation, and wherein the structural support layer comprises a rigid, porous foam material.

2. The composite exhaust flue of claim 1, wherein the insulating layer comprise one or more layers of a compressible ceramic material.

3. The composite exhaust flue of claim 2, wherein, the compressible ceramic material is in the form of felts, wools, cloths, other woven or non-woven ceramic textiles.

4. The composite exhaust flue of claim 2, wherein the compressible ceramic material is selected from the group consisting of metal oxides, nitrides, borides, basalts, carbides, and silicon carbide.

5. The composite exhaust flue of claim 2, wherein the compressible ceramic material comprises a metal oxide selected from the group consisting of alumina, silica, magnesia, and zirconia.

6. The composite exhaust flue of claim 1, wherein the insulating layer comprises glass or quartz fibers.

7. The composite exhaust flue of claim 1, further comprising supports extending from the ceramic fiber reinforced ceramic composite material face sheet towards the structural support layer without physically contacting the structural support layer.

8. The composite exhaust flue of claim 1, further comprising supports extending from the structural support layer towards the ceramic fiber reinforced ceramic composite material face sheet without physically contacting the ceramic fiber reinforced ceramic composite material face sheet.

9. The composite exhaust flue of claim 1, wherein the structural support layer is selected from the group consisting of a ceramic foam, a ceramic aerogel, a carbon foam, a metal foam, a polymeric foam, and a syntactic foam.

10. The composite exhaust flue of claim 1, wherein the structural support layer comprises a high temperature polymeric foam.

11. The composite exhaust flue of claim 1, wherein the rigid, porous foam material of the structural support layer has a density ranging from about 0.05 g/cc to about 0.8 g/cc, a compressive strength ranging from about 200 psi to about 5,000 psi, and a thermal conductivity below about 5 W/m K.

12. The composite exhaust flue of claim 11, wherein the rigid, porous foam material is carbon foam.

13. The composite exhaust flue of claim 1, further comprising at least one additional layer positioned between the insulating layer and the structural support layer, wherein the at least one additional layer has a use temperature about equal to or about greater than the use temperature for the structural support layer.

14. The composite exhaust flue of claim 13, wherein the at least one additional layer is selected from the group consisting of ceramic fiber reinforced ceramic composite material, a fiber reinforced polymer matrix composite, a fiber reinforced metal matrix composites, a metal, and a high temperature polymer.

15. A composite exhaust flue comprising a body defining a through bore extending therethrough, wherein the composite exhaust flue comprises an inner layer comprising a ceramic fiber reinforced ceramic composite material face sheet, a structural support layer, an insulating layer positioned between the ceramic fiber reinforced ceramic composite and the structural support layer, and supports positioned between the ceramic fiber reinforced ceramic composite material face sheet and the structural support layer without physically contacting at least one of the fiber reinforced ceramic composite material face sheet and the structural support layer, wherein the ceramic fiber reinforced ceramic composite material face sheet can withstand temperatures ranging from about 700° F. to about 2000° F. without significant mechanical or chemical degradation, and wherein the structural support layer comprises carbon foam.

* * * * *